US006644196B2

(12) United States Patent
Oetjen

(10) Patent No.: US 6,644,196 B2
(45) Date of Patent: Nov. 11, 2003

(54) ELECTRORHEOLOGICAL INKER

(75) Inventor: Arndt Oetjen, Dover, NH (US)

(73) Assignee: Heidelberger Druckmaschinen AG, Heidelberg (DE)

( * ) Notice: Subject to any disclaimer, the term of this patent is extended or adjusted under 35 U.S.C. 154(b) by 24 days.

(21) Appl. No.: 09/991,784

(22) Filed: Nov. 5, 2001

(65) Prior Publication Data

US 2003/0084810 A1 May 8, 2003

(51) Int. Cl.[7] .......................... B41F 31/00; B41M 1/42; G01D 15/16

(52) U.S. Cl. ..................... 101/491; 346/140.1; 101/489

(58) Field of Search ................................ 101/489, 491, 101/148, 199, 204, 205, 207, 208, 210, 295, 300, 301, 309, 310, 315, 318, 321, 323, 324, 329, 330, 331, 344, 347, 355, 360, 363, 364; 347/48, 102; 346/140.1

(56) References Cited

U.S. PATENT DOCUMENTS 2,988,990 A * 6/1961 Worth ........................ 101/219
3,661,081 A * 5/1972 Wright ....................... 101/489
4,440,082 A * 4/1984 Carey et al. ................ 101/170
5,044,275 A * 9/1991 Knopf et al. ............... 101/153
5,142,306 A * 8/1992 Arahara et al. .......... 346/140.1
5,213,037 A * 5/1993 Leopardi, II ................ 101/363
5,576,747 A * 11/1996 Sohn ........................... 347/48
5,829,355 A * 11/1998 Spengler ..................... 101/489

* cited by examiner

*Primary Examiner*—Andrew H. Hirshfeld
*Assistant Examiner*—Hoai-An D. Nguyen
(74) *Attorney, Agent, or Firm*—Davidson, Davidson & Kappel, LLC

(57) ABSTRACT

A method and device for controlling a transfer of an ink having electrorheological properties between rolls in a printing press. The method includes electrically connecting a first electrode to a first roll, electrically connecting a second electrode to a second roll, and circumscribing each of the first and second rolls with an electrically conductive layer. The method also includes establishing a rotational movement between the first and second rolls so as to enable a transfer of the ink from the first roll to the second roll across a first nip, and applying a voltage across the first and second electrodes so as to create a first electric field at the first nip. In addition, a printing unit including a first roll and a second roll configured to enable a transfer of an ink having rheological properties from the first roll to the second roll across a nip, the first and second rolls each having an electrically conductive layer circumscribed around them. A first voltage source is electrically connected to a first electrode that is electrically connected to the first roll and a second electrode is electrically connected to a second electrode that is electrically connected to the second roll for applying an electrical field at the nip.

2 Claims, 4 Drawing Sheets

ELECTRORHEOLOGICAL INKER

BACKGROUND

The present invention relates generally to printing presses and more particularly to the use of the electrorheological effect in printing presses.

In some printing presses the ink may be metered from an ink fountain in a long ink train consisting of as many as 8 to 22 adjacent rolls. The task of the long train ink is to reduce the thickness of the ink layer to the appropriate level corresponding with a desired ink density on the printed substrate.

In other printing presses the ink is metered instead using a short inking unit, or an Anilox metering device, removing the need for the long ink train. In a short inking unit, an engraved metering roll (i.e. Anilox roll) is used in order to meter ink from an ink reservoir. The ink fills engraved cells of a ceramic layer on the circumference of the metering roller to form an ink layer having a predetermined thickness. Typically, in waterless printing, for example, the ink is then transferred to a form roll before being deposited onto a silicon printing plate affixed to a plate cylinder. In some cases, the ink layer is transferred directly to the printing plate from the metering roll.

A disadvantage of using either an Anilox metering roll or a long ink train is that the ink density (i.e. thickness of the ink layer on the printed web surface) cannot easily be adjusted. To adjust the thickness of the ink layer in a short inking unit, one can replace the metering roll with another metering roll having the desired engraving depth. Another possibility is to change the slip between the metering roll and the form roll or rolls, for example, by rotating the metering roll at a faster or slower speed relative to the form roll. A third known possible way to change the ink density is to change the temperature of the metering roll and the form roll, or for a long ink train, to change the temperature several or all of the adjacent inking rolls. Changing the temperature of the rolls changes the temperature of the ink and thus its viscosity. The ink viscosity determines how much ink will be transferred from the metering roll to the form roll.

Each of these methods for adjusting the ink density is time consuming, costly, and may lead to undesirable results. For example, it takes a long time to change the temperature of the rolls and the temperature-viscosity relationship can be different depending the ink types, and the different ink colors (cyan, magenta, yellow, and black). Replacing a metering roll with another metering roll of a different thickness is expensive and requires that the press is non-operational for a relatively long period of time. Finally, changing the slip between rollers requires experimentation to determine the proper slippage for each ink that can vary depending on additional press conditions, and can lead to inaccurate results.

Waterless inks are typically preferred for sheetfed lithographic processes. One reason is that waterless inks have a higher viscosity and tack level that allows for 100% release from the mostly silicone non-printing areas of the plates. After transferring the ink from the image area of the printing plate to the blanket, the ink is printed on the paper. Because of the high viscosity and tack of the ink, the ink can generate a so-called picking problem, in which the ink pulls out parts of the surface of the paper as the surface of the blanket separates from the paper. The small bits of paper accumulate on the surface of the blanket and plate cylinders, decreasing printing quality and requiring frequent cleaning of the blanket and plate cylinders. The picking problem is especially severe when lower quality paper is used, for example, newspaper. In these printing applications in which lower quality paper is used, the fibers of paper picked by the ink appear as lint, (the phenomenon is often referred to as linting), making efficient printing nearly impossible. Reducing the viscosity of the ink has the positive effect of reducing the Tinting in these processes, but also the negative effect of the ink toning. That is, as ink is transferred from the form roll to the plate cylinder, the less viscous ink adheres to the non-image areas of a plate—where it is not supposed to adhere—and is thus transferred to areas of the paper where it should not print.

The electrorheological effect is a known phenomenon by which certain fluids change their viscosity and flow characteristics when an electrical field is applied. Certain fluids having electrorheological properties exhibit a positive electrorheological effect when subjected to an electric field in that their viscosity is increased. Other fluids having electrorheological properties exhibit a negative electrorheological effect when subjected to an electric field in that their viscosity decreases. German Patent Document No. DE 44 16 822 describes a method of controlling and drying of coating materials in machines and controlling the inking in printing machines. The document describes generally utilizing the electrorheological effect of electrical fields, but does not describe how the electrical field should be applied to rolls of an ink train. Printing presses including a short inking unit typically use a metering roll having a non-conducting ceramic outer surface and a form roll having a non-conducting rubber outer surface. Applying an electric field across a nip between surfaces of such rollers would require very high voltages and therefore is not practical.

BRIEF DESCRIPTION OF THE INVENTION

The present invention provides a method of controlling a transfer of an ink having electrorheological properties between rolls in a printing press. The method includes electrically connecting a first electrode to a first roll, electrically connecting a second electrode to a second roll, circumscribing each of the first and second rolls with an electrically conductive layer, establishing a rotational movement between the first and second rolls so as to enable a transfer of the ink from the first roll to the second roll across a first nip defined between the first and second rolls, and applying a voltage across the first and second electrodes so as to create a first electric field at the first nip for influencing a flow of the ink from the first roll to the second roll. The present invention, of course, extends to printing presses including more rolls beyond the first and second rolls specifically referred to here.

The first roll may be a metering roll and the second roll may be a form roll. The first roll may be a form roll and the second roll may be a plate cylinder. Alternatively, the first roll may be a blanket roll and the second roll may be a second blanket cylinder or an impression cylinder. The circumscribing of each of the first and second rolls may include circumscribing the metering roll with an electrically conductive ceramic layer and/or circumscribing the form roll with an electrically conductive rubber layer.

The method may also include electrically connecting a third electrode to a third roll, circumscribing the third roll with an electrically conductive layer, establishing a rotational movement between the second roll and the third roll so as to enable a transfer of the ink across a second nip between the second and third rolls, and applying a second electric field at the second nip to influence a flow of the ink from the second roll to the third roll.

In the case of a printing press having a third roll, the first roll may be a metering roll, the second roll may be a form roll, and the third roll may be a plate cylinder. The electric field may influence the flow of the ink by changing a viscosity of the ink, such as by increasing or decreasing a viscosity of the ink.

The present invention also provides a printing unit that includes a first roll and a second roll configured to enable a transfer of an ink having rheological properties from the first roll to the second roll across a first nip defined between the first and second rolls, the first and second rolls each having an electrically conductive layer circumscribed around them. The printing unit also includes a first electrode electrically connected to the first roll, a second electrode electrically connected to the second roll, and a first voltage source electrically connected to the first and second electrodes to apply an electrical field at the first nip.

The first roll in the printing unit may be a metering roll and the second roll may be a form roll. The first roll may also be a form roll and the second roll may be a print cylinder. Alternatively, the first roll may be a blanket cylinder and the second roll may be a second blanket cylinder or an impression cylinder.

The printing unit may also include a third roll configured to enable a transfer of the ink from the second roll to the third roll across a second nip defined between the first and second rolls, and a second voltage source configured to apply an electric field at the second nip. In the case of the printing unit having a third roll, the first roll may be a metering roll, the second roll may be a form roll and the third roll may be a plate cylinder.

The print unit may also include an ink reservoir containing the ink, wherein the metering roll is configured to meter the ink from the ink reservoir. The second voltage source may be electrically connected to the second and third rolls. The electrically conductive layer of the first roll may include an electrically conductive ceramic layer, and the electrically conductive layer of the second roll may include an electrically conductive rubber layer.

BRIEF DESCRIPTION OF THE DRAWINGS

Similar elements are numbered similarly in the Figures.

DETAILED DESCRIPTION

Figure 1:
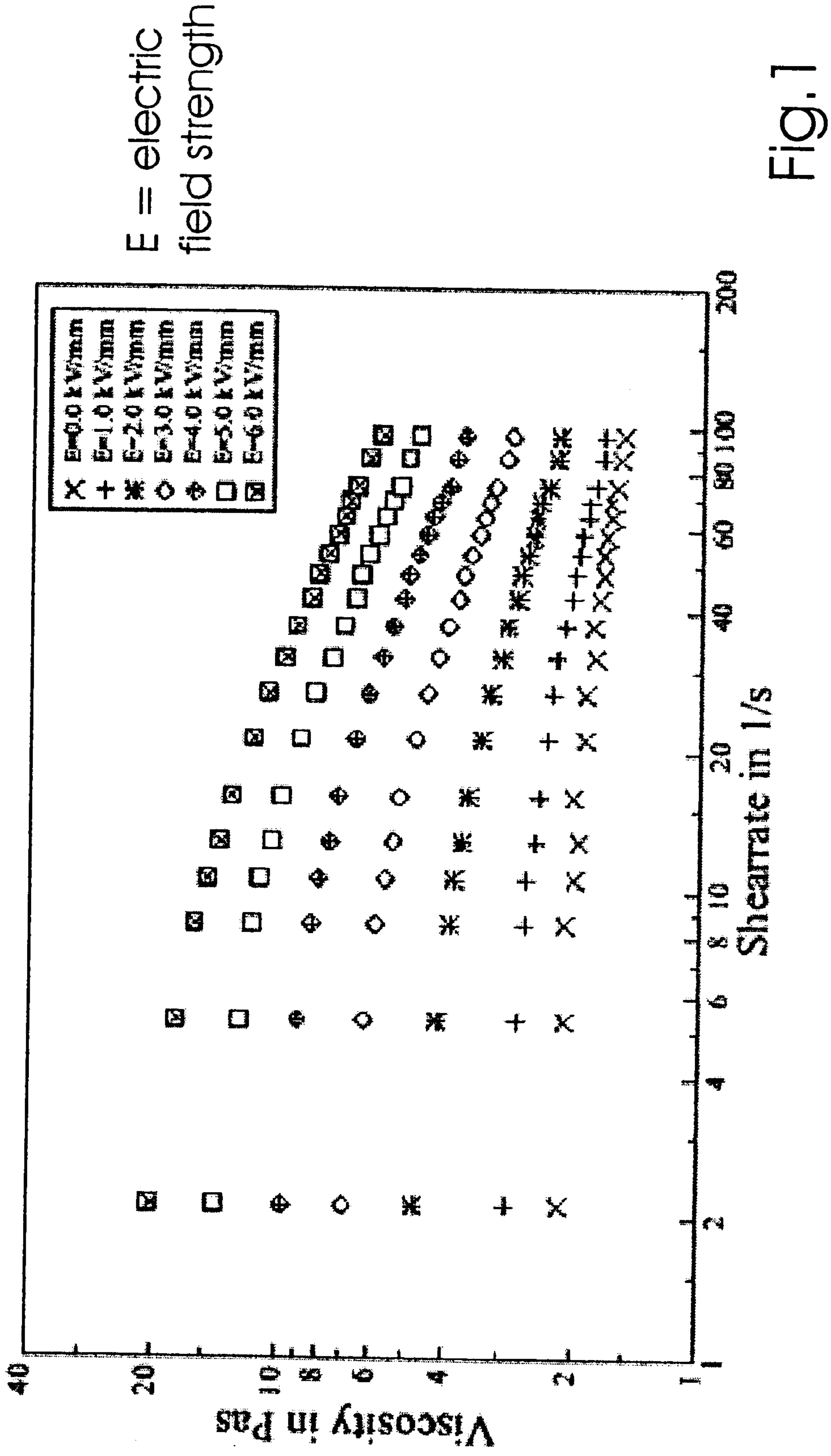
FIG. 1 is a diagram showing the relationship between viscosity and shear rate of an electrorheological fluid under various electric field strengths.

FIG. 1 illustrates the behavior of electrorheological fluids. Specifically, applying an electric field of varying strengths from 1.0 kV/mm to 6.0 kV/mm changes the viscosity of the fluid. The higher the electric field strength, the greater the viscosity of the electrorheological fluid.

Figure 2:
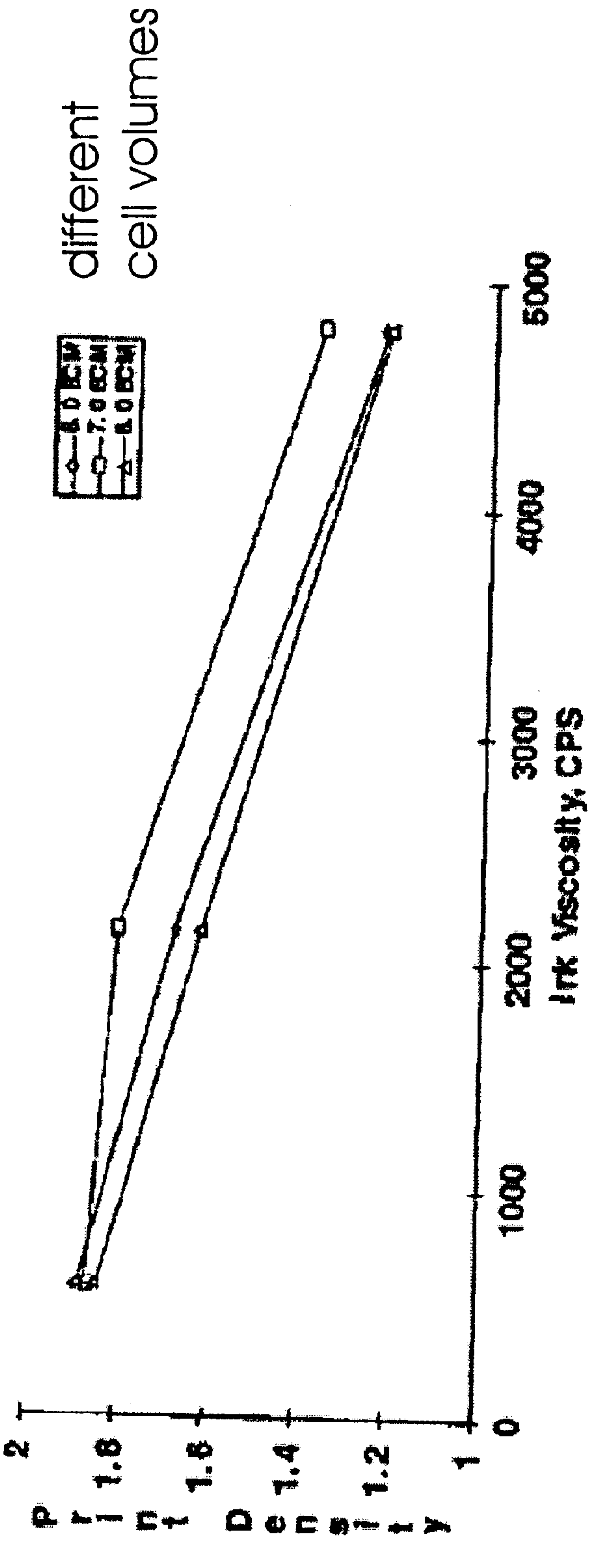
FIG. 2 is a diagram showing the relationship between print density and ink viscosity for various cell volumes of an ink, for example in a flexo printing press.

FIG. 2 illustrates the relationship between an ink's viscosity and its print density. As illustrated, the print density decreases for a given ink volume (measured here as the volume of ink in a cell of an Anilox metering roll), as the viscosity increases.

Figure 3:
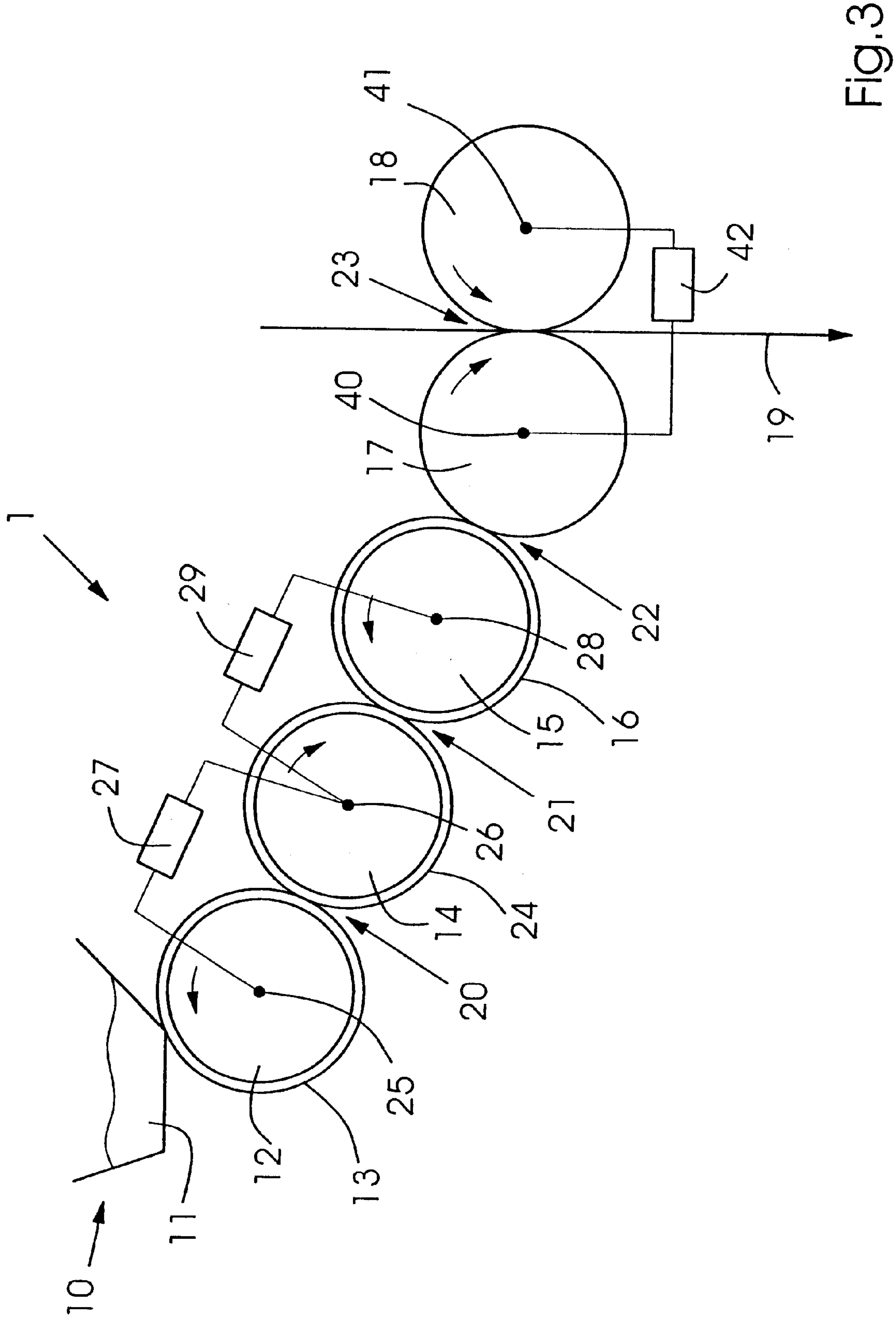
FIG. 3 shows a partial schematic cross-sectional view of a an exemplary printing press according to the present invention having an Anilox metering roll.

FIG. 3 shows an exemplary embodiment of printing press 1 according to the present invention. Reservoir 10 includes a supply of ink 11. Metering roll 12 is in contact with ink reservoir 11 and includes a ceramic outer layer 13 forming individual cells circumscribed around metering roll 12. As metering roll 12 rotates in a counterclockwise direction, it meters an amount of ink 1, which fills the cells in ceramic layer 13 circumscribed around metering roll 12. Ceramic layer 13 of metering roll 12 is in rolling contact with rubber layer 24 circumscribed around form roll 14 at first nip 20. Form roll rotates in a clockwise direction. The rotational movement between metering roll 12 and form roll 14 effects a transfer of the ink 11 across first nip 20 from ceramic layer 13 to rubber layer 24.

Plate cylinder 15 includes printing plate 16 circumscribed around printing plate 16. Plate cylinder 15 is in rolling contact with rubber layer 24 of form roll 14 at second nip 21 and rotates in a counterclockwise direction. The rotational movement between form roll 14 and plate cylinder 15 effects a transfer of the ink 11 from rubber layer 24 of form roll 14 to printing plate 16 of plate cylinder 15 across second nip 21.

Blanket cylinder 17 is in rolling contact with plate cylinder 15 at a plate-to-blanket nip 22 and rotates in a clockwise direction. The rotational movement between plate cylinder 15 and blanket cylinder 17 effects a transfer of the ink 11 from printing plate 16 of plate cylinder 15 to blanket cylinder 17 across plate-to-blanket nip 22, thus transferring an image from the plate cylinder to the blanket cylinder.

A web of material 19, for example paper, may pass between first blanket cylinder 17 and second blanket cylinder 18, which thus forms blanket-to-blanket nip 23. The second blanket cylinder 18 rotates in a counterclockwise direction. A second plate cylinder (not shown) may interact with second blanket cylinder 18. Rotational movement between the first and second blanket cylinders 17 and 18 causes web of material 19 to move through the blanket-to-blanket nip 23 and transfer the ink 11, (and thus the image) from first blanket cylinder 17 onto web 19. Ink may also be transferred from second blanket cylinder 18 to the opposite side of the web of material 19. In single-sided printing applications, second blanket cylinder 18 could instead be an impression cylinder, without any plate cylinder associated with it.

In order to take advantage of the electrorheological effect, the ink 11, in ink reservoir 10 should be chosen as an ink having electrorheological properties. An electric field can be generated across the first nip 20 by electrically connecting a first electrode 25 to metering roll 12 and a second electrode 26 to form roll 14, and by applying a voltage (using either AC or DC) across first and second electrodes 25 and 26, such as by connecting first voltage source 27 to first and second electrodes 25 and 26. Similarly, an electrical field can be generated across the second nip 21 by electrically connecting a third electrode 28 to plate cylinder 15 and by applying a voltage across second and third electrodes 26 and 28, such as by connecting second voltage source 29 to second and third 26 and 28. An electrical field can also be generated across the blanket to blanket nip 23 by applying a voltage across fourth and fifth electrodes 40 and 41, for example by connecting a third voltage source 42 to fourth and fifth electrodes 40 and 41. Alternatively, the electric field could be applied between blanket cylinder 17 and the web of material 19, such as by connecting the web of material 19 to ground or to a voltage source.

One disadvantage of applying an electrorheological effect to the transfer of inks in printing presses has been the high electric field strength, and thus the high voltage that is required. The electric field strength E is dependent on the gap between the electrodes l and the applied voltage U.

$$E=U/l$$

The necessary electric field for significant electrorheological effects on fluids is on the order of kV/mm. Since the rubber coating on a form roller can be up to 10 mm, and the engraved ceramic layer on a metering roller can be up to 1 mm, the gap between the conductive metal form and roll cylinders measured at their nip may be 11 mm. Thus, the required voltage that need be applied to generate an effective electric field of 1 kV/mm, would be 11 kV. This voltage is too high to be practically usable in a modern printing press. Thus, the use of the electrorheological effect to regulate the transfer of ink in printing presses has not been used in practice.

Reducing the gap between the rolls would result in a reduction in the required applied voltage. The gap can be reduced by using a conductive material for the rubber layer of the form roll or the blanket roll, and for the ceramic of the metering roll. By using a conductive material in place of the insulating rubber or ceramic outer layers presently used, the gap between the form and metering rolls (measured at the nip) is reduced to the ink layer (and the plate image or non-image area respectfully). Thus, the required applied voltage is reduced greatly. For example, if the thickness of the ink is approximately 10 μm, the applied voltage required to generate a 1 kV/mm electric field is reduced to 10V.

$$U=E\times l=1\text{ kV/mm}\times 10\times 10^{-3}\text{ mm}=10\text{V}$$

Several materials are known as replacements for non-conductive materials. For example, conductive fillers such as carbon black, and aluminum, iron, and silver powders can be used as filler material in an otherwise non-conductive rubber material, such as polyurethane, silicone rubber, NBR or EPDM. Conductive fillers can also be used together with otherwise non-conductive ceramics to make those materials conductive. In addition, inherently conductive polymers (ICPs) can also be used in place of the rubber or ceramic coverings on the rolls. Examples of ICPs include polyacetylen, polyaniline, polypyrrole, polythiophene, together with a dopant such as a lithium, sodium, or calcium percholate, fluorbate, or phenylsulfate.

Figure 4:
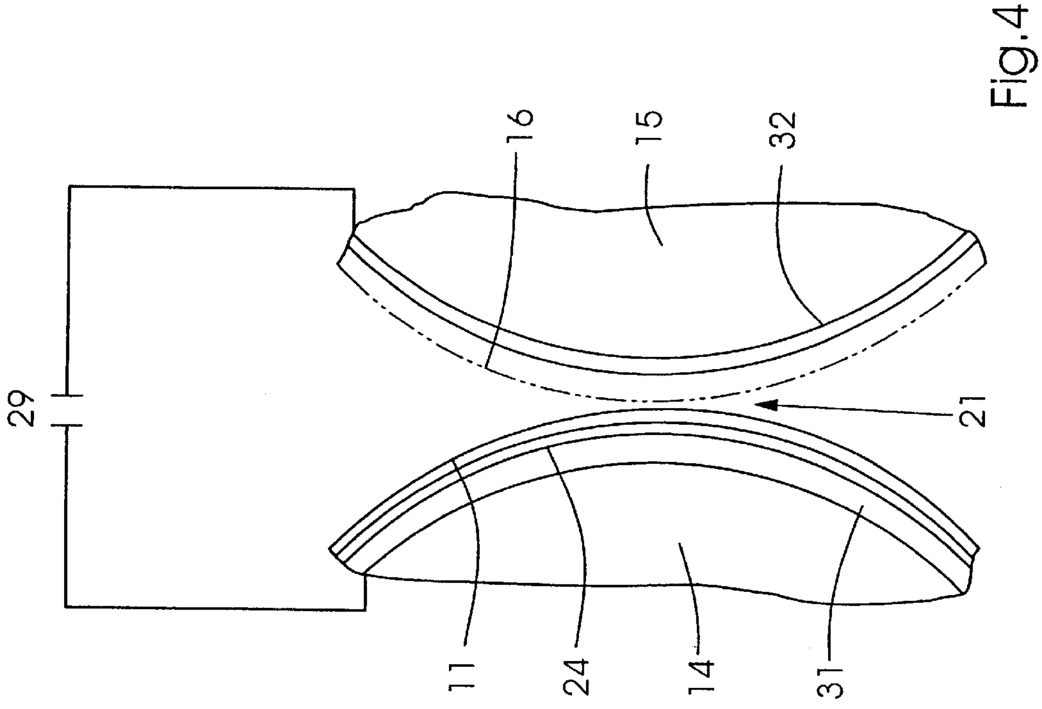
FIG. 4 shows a partial schematic cross-sectional view of a form roll and a plate cylinder in a printing press according to the present invention.

FIG. 4 shows a partial view of form roll 14 and plate cylinder 15, at second nip 21, at which they are in rolling contact with one another. Plate cylinder 15 includes printing plate 16 disposed on a circumferential surface 32 of plate cylinder 15. Form roll 14 includes rubber layer disposed on circumferential surface 31 of form roll 14. A film of ink 11 clings to the surface of rubber layer 13. Second voltage source 28 is shown schematically.

When an electrorheological ink is used together with an electric field in order to increase the inks viscosity according to the present invention, lower viscosity inks may be employed. Thus, the problem of linting, discussed above, can be avoided. At the same time, the problem of toning that usually accompanies low viscosity ink also avoided. This is because the ink passes through an electric field at the time the ink is transferred from the form roll to the plate cylinder. The electric field increases the ink viscosity, thus improving its release from the form roll to the plate cylinder and keeping it from adhering to non-image areas of the printing plate. Outside the electric field, the ink loses the electrorheological effect and returns to its initial viscosity. When transferring to the paper (or other print medium) the viscosity is low and therefore linting will not occur.

Solvent-based printing inks consist of pigment, resin, solvent and additives. All of these ingredients are to some degree hydrophobic and the inks do not exhibit the electrorheological effect. Water-based inks, for example those available from Sun Chemical include the similar types of ingredients as solvent-based inks, but the ingredients tend to be more hydrophilic. A combination of some ingredients from the solvent-based inks and the water-based inks can result in a fluid that exhibits the electrorheological effect. The electrorheological fluid may include a solvent, "hydrophilic substances," an activator and a stabilizer. For example, the solvent for an electrorheological ink may be a mineral oil, a vegetable oil, or a polyol. The hydrophilic substances may include pigments with a hydrophilic part, and/or special ingredients such as a thickener (e.g. corn starch), a complex aluminum soap (see e.g., German Patent Document DE 41 390 65 A1), an ionic polymer as a resin, or other materials that exhibit the electrorheological effect. The activator may include a polar liquid, for example, water, alcohol, (amine or alcohol) ethylene glycol, or others. The stabilizer may include a surfactant, which may not be necessary if the initial viscosity of the ink is high enough.

Figure 5:
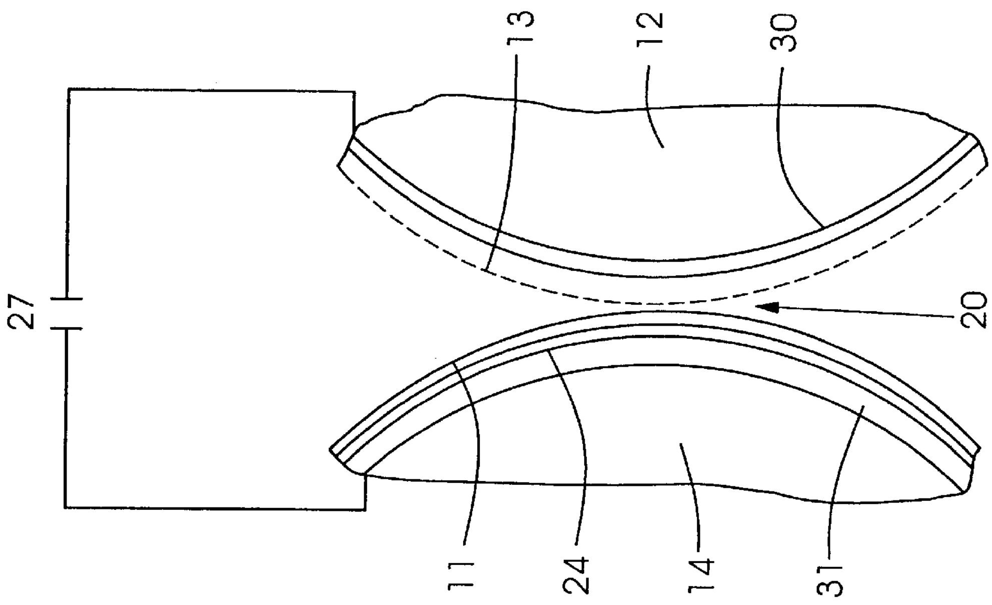
FIG. 5 shows a partial schematic cross-sectional view of a form roll and a metering roll in a printing press according to the present invention.

Provided that the printing ink exhibits the electrorheological effect, an electrical field may be applied between the metering roll and a form roll according to FIG. 5 in order to vary the ink density as desired. The initial viscosity of the ink should be only as high as necessary to reduce or eliminate linting, picking, etc. Under the application of the electric field, the viscosity can be controlled very quickly. Thus, with no electric field, or a low strength electric field, the ink viscosity is low resulting in more complete emptying of the cells of the engraved metering roll and a higher print density. On the other hand, while under a substantially high electric field strength (for example, on the order of 1 to 10 kV/mm, but preferably less than around 3 kV/mm) the viscosity of the printing ink is high, resulting in a less complete emptying of the engraved cells of the metering roll, and a lower density printing. It is also possible, according to the present invention, to control the print density across axial zones of the rolls and also across circumferential zones by changing the electric field strength depending on the image.

FIG. 5 shows a partial view of form roll 14 and metering roll 12, at first nip 20, at which they are in rolling contact with one another. Metering roll 12 includes ceramic layer 13 disposed on a circumferential surface 30 of metering roll 12. Ceramic layer 13 is engraved and contains ink 11. Form roll 14 includes rubber layer disposed on circumferential surface 31 of form roll 14. A film of ink 11 clings to the surface of rubber layer 13. First voltage source 27 is shown schematically.

According to the present invention, inks may also be used which exhibit a negative electrorheological effect when placed under an electric field. This has the effect of reducing the ink's viscosity. This can be advantageous, for example to improve the release of the ink, for example from the form roll to the plate cylinder or from the plate cylinder to the blanket cylinder by generating an electric field at the nip between the appropriate rolls. In addition, the negative electrorheological effect can also be used to improve the release of the ink from the blanket cylinder to the printable material, such as paper. This can be accomplished by generating an electric field between the blanket cylinder and a second blanket cylinder on the opposite side of the sheet or web of printable material, or by between the blanket cylinder and an impression cylinder on the opposite side of the sheet or web. The negative electrorheological effect may also be advantageously used, for example, in sheet fed applications by generating an electric field between the blanket and impression cylinders in the perfection sector of the sheet fed press to cause separation to occur within the ink and to generate a thin layer of solvent (e.g. mineral oil) to cover the impression cylinder and improve the release.

The present invention may be useful for all kinds of printing applications, including but not limited to offset, flexo, and gravure printing processes.

What is claimed is:

1. A printing unit comprising:

a metering roll and a form roll configured to enable a transfer of an ink having rheological properties from the metering roll to the form roll across a first nip defined between the metering and form rolls, the metering roll having an electrically conductive ceramic layer and the form roll having an electrically conductive rubber layer;

a first electrode electrically connected to the metering roll;

a second electrode electrically connected to the form roll;

a plate cylinder configured to enable a transfer of the ink from the form roll to the plate cylinder across a second nip defined between the form roll and the plate cylinder;

a first voltage source electrically connected to the first and second electrodes to apply an electrical field at the first nip and to increase a viscosity of the ink as the electrical field increases; and a second voltage source configured to apply an electric field at the second nip and being electrically connected to the form roll and the plate cylinder.

2. The print unit as recited in claim 1 further comprising an ink reservoir containing the ink and wherein the metering roll is configured to meter the ink from the ink reservoir, the first voltage source altering electric field strength across axial zones and circumferential zones of the form roll as a function of an image to be printed.

* * * * *